US010102272B2

(12) United States Patent
Musuluri

(10) Patent No.: US 10,102,272 B2
(45) Date of Patent: Oct. 16, 2018

(54) SYSTEM AND METHOD FOR RANKING DOCUMENTS

(71) Applicant: Aravind Musuluri, Birmingham, AL (US)

(72) Inventor: Aravind Musuluri, Birmingham, AL (US)

(*) Notice: Subject to any disclaimer, the term of this patent is extended or adjusted under 35 U.S.C. 154(b) by 150 days.

(21) Appl. No.: 15/208,593

(22) Filed: Jul. 12, 2016

(65) Prior Publication Data

US 2017/0011043 A1 Jan. 12, 2017

Related U.S. Application Data

(60) Provisional application No. 62/191,486, filed on Jul. 12, 2015.

(51) Int. Cl.
*G06F 17/30* (2006.01)

(52) U.S. Cl.
CPC .............. *G06F 17/30616* (2013.01)

(58) Field of Classification Search
CPC ......... G06F 17/30616; G06F 17/30011; G06F 17/3053

USPC ........................................................ 707/723
See application file for complete search history.

(56) References Cited

U.S. PATENT DOCUMENTS

| | | | | |
|---|---|---|---|---|
| 8,166,051 | B1* | 4/2012 | Bauer | G06F 17/30663 707/749 |
| 9,015,153 | B1* | 4/2015 | Zhang | G06F 17/28 707/723 |
| 9,043,926 | B2* | 5/2015 | Hart | G06F 21/604 726/26 |
| 9,110,986 | B2* | 8/2015 | Fuchs | G06F 17/30734 |
| 9,146,915 | B2* | 9/2015 | He | G06F 17/2785 |
| 9,407,463 | B2* | 8/2016 | Nigam | H04L 12/585 |
| 9,454,602 | B2* | 9/2016 | Misra | G06F 17/3071 |
| 9,519,706 | B2* | 12/2016 | Luke | G06F 17/2705 |
| 9,645,985 | B2* | 5/2017 | Chen | G06F 17/24 |

* cited by examiner

*Primary Examiner* — Sheree N Brown

(57) ABSTRACT

Systems and methods for enhancing user experience in a search environment are provided. The method includes ranking documents which have multiple zones wherein one zone in a document dominates rest of the zones in the document.

11 Claims, 6 Drawing Sheets

400

| Zone | Text | Processed Text | Terms (Score) | |
|---|---|---|---|---|
| Dominant Zone | State of Colorado | Colorado | colorado (1) | 410 |
| Dominant Zone | University of Colorado, Colorado | University of Colorado, Colorado | university (0.9), colorado (0.9) | 411 |
| Non Dominant Zone | ... John ... | ... John ... | john (0.1) | 412 |
| Non Dominant Zone | ... Location ... | ... Location ... | location (0.1) | 413 |

FIG. 4

Funtoi Search www.funtoi.com

501
Colorado                                          Search

502
Colorado - Wikipedia
en.wikipedia.org/wiki/Colorado
        State of Colorado
Population:    5,355,366
Area:    104,094 sq mi
Governor:    John Hickenlooper
Time zone:    Mountain: UTC-07/UTC-06

503
University of Colorado - Info
www.information.com/University_of_Colorado
        University of Colorado, Colorado
Motto:    Let Your Light Shine
Established:    1876
Endowment:    $1.063 billion
Location:    Boulder, Colorado

504
History of Colorado - Webinfo
www.webinfo.com/History_of_Colorado
        History of Colorado
Ancient Pueblo Peoples — A diverse group of tribes that lived in the valleys and mesas of the Colorado Plateau 505
List of U.S. states by population growth rate – US
www.uswebinfo.com/List_of_U.S._states
        List of States with high growth rates

| Rank | State | Growth Rate |
|---|---|---|
| 1 | North Dakota | +9.95% |
| 2 | Texas | +9.50% |
| 3 | Colorado | +6.50% |

FIG. 5

SYSTEM AND METHOD FOR RANKING DOCUMENTS

CROSS REFERENCE TO RELATED APPLICATION

This application claims priority to U.S. Provisional Application Ser. No. 62/191,486 entitled "System And Method For Ranking Documents" filed on Jul. 12, 2015, which is incorporated herein by reference.

TECHNICAL FIELD

The present disclosure generally relates to a method to rank documents. Particularly, the disclosure relates to ranking documents which have multiple zones wherein one zone in a document dominates rest of the zones in the document.

BACKGROUND

The disclosures in this section merely provide background information related to the present disclosure and may not constitute prior art.

It is commonly required in the field of Information Technology to provide a service that searches through data sources. The data source herein may refer to data and/or document(s) on the Internet, intranet, storage devices, and so on. In order to use a search engine, a user seeking information on a desired topic generally inputs a search query consisting of terms relevant to the topic into the search interface of the search engine. In response, the search engine typically displays a search results report with a prioritized list of links pointing to relevant documents containing the search query terms. Oftentimes, a short summary of text i.e., extract/snippet is also included for each result. The extract/snippet is that portion or portions of the text in the document that contain the terms from the search query.

While displaying search results for a query, ordering of the documents that are displayed plays an important role in enhancing the user experience. There are many known methods for ranking the documents that are displayed based on their relevancy for a given search query. One of the most common methods used to prioritize the documents is the Term Frequency-Inverted Documented Frequency (TF-IDF) method. This method is widely used in various search engines. But it does not always produce the desired results. One primary disadvantage of the TF-IDF method is that it does not take into account the positioning of the terms in the documents. This is particularly relevant for shorter documents.

The TF-IDF method may hence work well for long documents, but may not work well for short documents. The TF-IDF method is based on term frequency. In short documents, the position of the terms may be more important than the term frequency. Hence it may not be an accurate method of ranking in case of short documents.

In view of the above drawbacks, there remains a need for an effective method of ranking short documents based on different criteria which would give the user relevant results at the top thereby making it easier for the user to find the desired information.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Exemplary embodiments of the present disclosure are directed towards a method and system for ranking documents which have multiple zones wherein one or more zones in a document dominate rest of the zones in the document.

According to the aspects illustrated herein, the present disclosure relates to a method of ranking the documents of a data source, wherein the documents comprise multiple zones selected from one or more dominant and non-dominant zones.

In accordance with one aspect of the present disclosure, the disclosure relates to a method of pre-assigning a score to the distinct terms of the documents of a data source; said method comprising (a) dividing each document or a portion of the document into dominant and non-dominant zones (b) calculating the total number of distinct terms in the dominant zone (c) assigning a dominant zone score to all the distinct terms in the dominant zone of said document, such that the dominant zone term score is inversely proportional to the number of distinct terms in said zone (d) assigning a non-dominant zone score for all the distinct terms in the non-dominant zones that are not present in the dominant zones.

In a preferred embodiment of the current aspect, the scores of the non-dominant zone terms are lower than the scores of the dominant zone terms for any document.

In another preferred embodiment, the dominant zone is a title.

In some embodiments, the content of a document may be tokenized before pre-assigning a score to the distinct terms of the document.

In another aspect of the present disclosure, the disclosure further relates to a method of ranking search results in response to a user search query; said method comprising (a) accepting a search query comprising search query terms (b) identifying documents comprising the search query terms (c) for each document, computing a search query term score for each search query term, wherein the search query term score is a dominant zone score or a non-dominant score for a matching term in the document (d) computing a document score for each document wherein the document score is a sum total of matched search query term scores in of the document (e) ranking the search results according to the document score for the said query.

In a preferred embodiment, the search results with a higher document score are ranked higher.

Documents with the same score may be further ranked based on the frequency or popularity of the non-query terms in the dominant zones. The higher the popularity of the non-query term, the higher or better is the ranking of the document.

In another aspect of the present disclosure is provided a system comprising search engine unit. The search engine unit may comprise one or more logics configured to perform the functions and operations associated with the above-disclosed methods.

In another aspect of the present disclosure is provided a computer program product executable in a memory of a search engine unit.

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein:

FIG. 4 illustrates an exemplary score calculation method in accordance with an embodiment of the present disclosure.

FIG. 5 depicts an exemplary search operation in accordance with the present disclosure.

DETAILED DESCRIPTION

Figure 1:
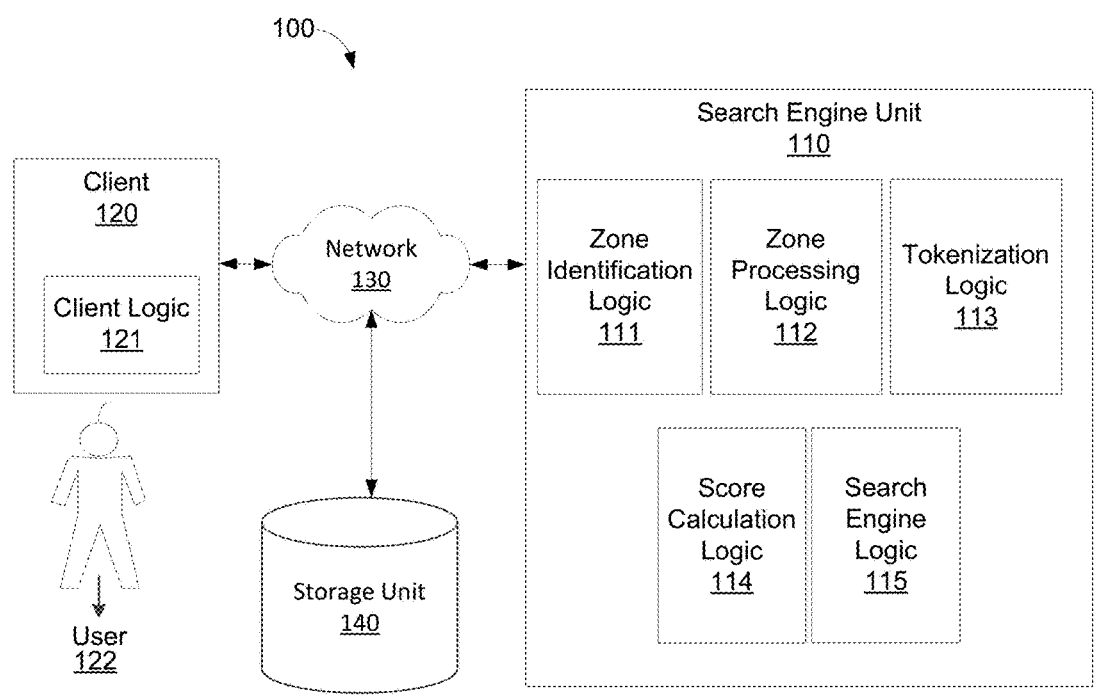
FIG. 1 is a block diagram illustrating an exemplary search environment in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Power point documents, news group postings, multimedia objects and/or Shockwave Flash files.

FIG. 1 depicts a search environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present disclosure. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

The exemplary search engine unit 110 comprises zone identification logic 111, zone processing logic 112, tokenization logic 113, score calculation logic 114 and search engine logic 115.

In the exemplary search engine unit 110, the zone identification logic 111 may be configured to identify zones and differentiate one zone from the other. In this regard, the zone identification logic 111 distinguishes dominant zones from non-dominant zones.

The search engine unit 110 further comprises the zone processing logic 112. The zone processing logic 112 may be configured to identify phrases in the dominant and/or non-dominant zones and replace them with equivalent words.

In one embodiment, the zone processing logic 112, may further process dominant zones using natural language techniques know in the art. The zone processing logic 112 may identify part of speech for words in the dominant zone. Any adjectives found in the dominant zone may be purged from dominant zones and treated as if they are part of non-dominant zones and scored accordingly.

The search engine unit 110 further comprises the tokenization logic 113. The tokenization logic 113 may be configured to tokenize search keyword(s) and process zones into terms. The process of tokenization into terms may include, but not limited to, removing of stop words, less values adding words, normalization, stemming, lemmatization, and combinations thereof.

The search engine unit 110 further comprises the score calculation logic 114. The score calculation logic 114 may be configured to calculate and assign scores to terms in documents tokenized by the tokenization logic 112. The score calculation logic 114 ignores any repetitive terms i.e. the scores are only assigned to terms that are distinct. If a term occurs in multiple zones, the score for the term may be calculated based on its occurrence in the most dominant zone among the multiple zones ignoring all other occurrences of the term.

The score for a term is based on the zone in which the term occurs and the number of distinct terms within the zone. In a preferred embodiment, the score for each term in a zone is inversely proportional to the number of distinct terms in the zone. As the number of distinct terms in a zone increases, the score for each term in the zone decreases. Scores for terms in dominant zones may have higher values than terms in non-dominant zones.

In a preferred embodiment, all the dominant zones are combined into one dominant zone.

In another embodiment, the scores calculated by the score calculation logic 113 may be stored in the storage unit 140.

The score calculation logic 114 is further explained with respect to FIG. 3 and FIG. 4.

The search engine unit further comprises the search engine logic 115. The search engine logic 115 may be configured to display the documents which are related to a search query according to the ranking of the documents. The ranking of the documents may be according to the scores of the search query terms in the matching documents.

The storage unit 140 is configured to store information associated with ranking documents, or the like. In various embodiments, such information may include, without limitation, domains, URLs, webpages, websites, documents, stop words, less value adding words, phrases and their equivalent words, document terms, term scores, indexes, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to ranking documents, or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 122 through the client logic 121 on the client 120 may enter a search query consisting of terms(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 examines the storage unit 140 and compiles a list of documents containing all or some of the term(s) according to the scores of the search terms in the documents and returns the search results according to the rank of the documents.

Figure 2:
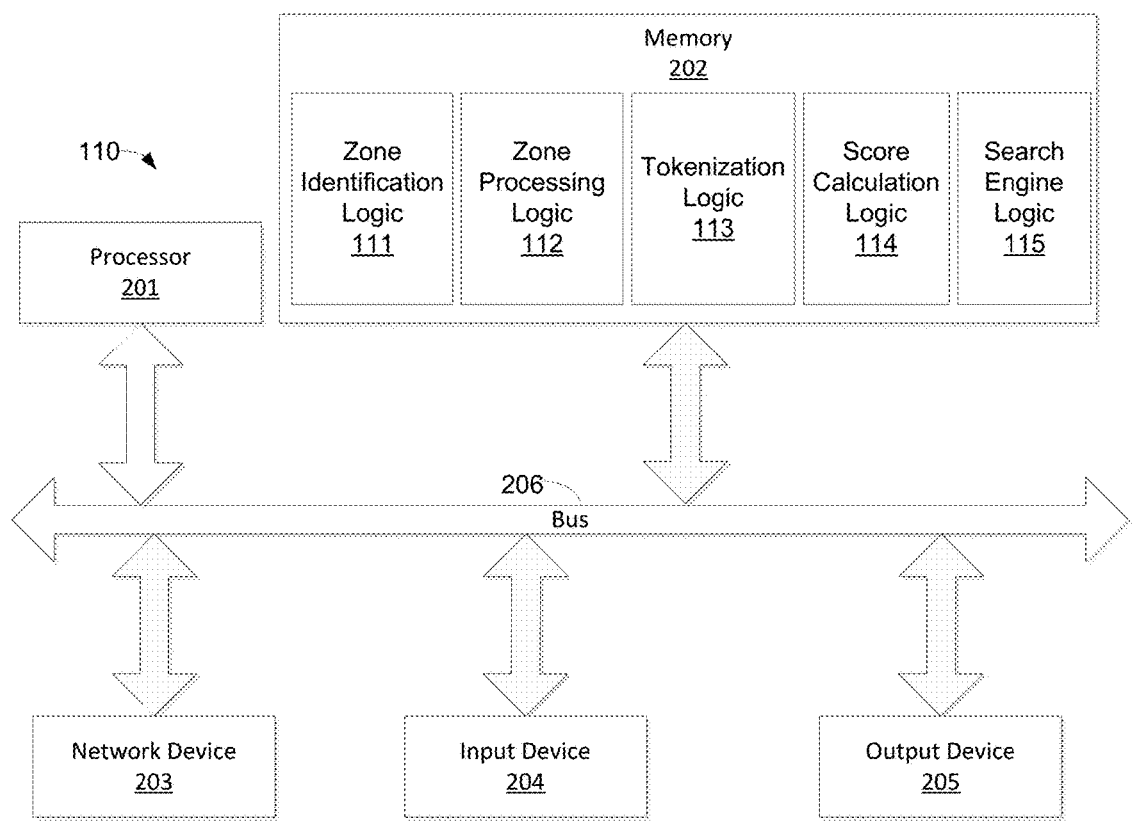
FIG. 2 is a block diagram of an exemplary computing device of FIG. 1.

In some preferred embodiments the search engine unit 110 (FIG. 1) is as disclosed in FIG. 2. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In some preferred embodiments, the search engine unit 110 (FIG. 1) may include a bus 206, a processor 201, memory 202, network device 203, input device 204, and an output device 205. Bus 206 may include a path that permits communication among the components of the search engine unit 110 (FIG. 1).

The search engine unit 110 (FIG. 1) stores the zone identification logic 111 (FIG. 1), the zone processing logic 112 (FIG. 1), the tokenization logic 113 (FIG. 1), the score calculation logic 114 (FIG. 1) and search engine logic 115 (FIG. 1) as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input unit 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110, depicted by FIG. 1, all the components are implemented by software and stored in memory 202.

Figure 3A:
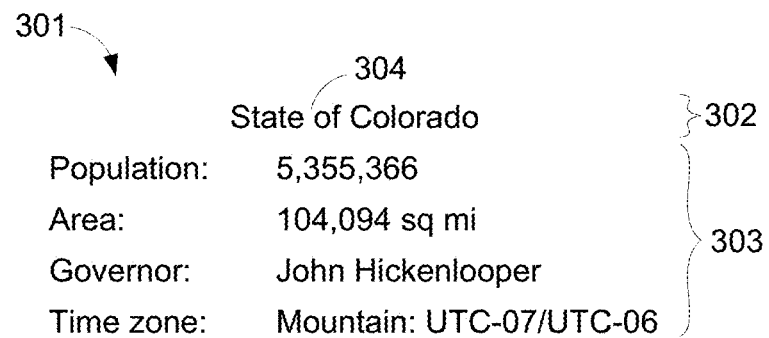
FIG. 3A and FIG. 3B illustrate exemplary documents comprising of dominant and non-dominant zones.
Figure 3B:
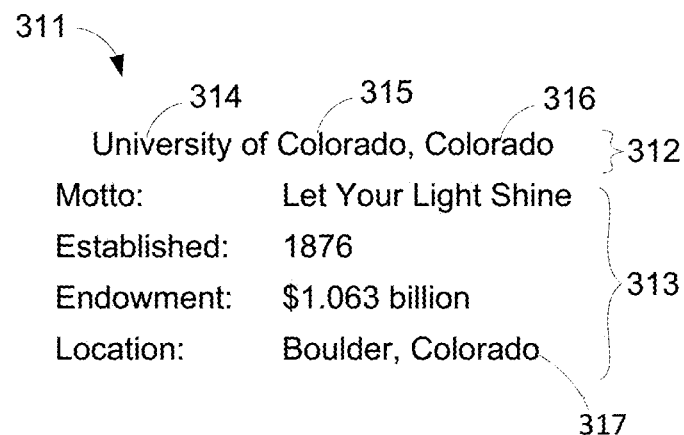

FIG. 3A and FIG. 3B depict exemplary documents 301 and 311 respectively, in accordance with one embodiment of the present disclosure. By documents it may mean whatever units of data or information the search system may be built upon. These documents may be a part of other documents. For example, documents may be, but not limited to, lists, tables, question and answers, timelines and/or key/value pairs within webpages. In one embodiment, documents 301 and 311 may be part of a larger document. The documents that need to be indexed may be stored in the storage unit 140.

The said documents may comprise of several zones. In one embodiment, the zones may be classified into dominant and non-dominant zones. In FIG. 3A, document 301 comprises a dominant zone 302 and a non-dominant zone 303. Similarly, in FIG. 3B, document 311 comprises a dominant zone 312 and a non-dominant zone 313.

Note that in one embodiment, there may be more than one dominant and non-dominant zone. Note that the dominant and non-dominant zones may be in any format. In a preferred embodiment, the dominant zone is a title.

In one preferred embodiment, the zones may be further processed. For example, in the dominant zone 302, the phrase "State of Colorado" 304 may be reduced to the equivalent word "Colorado" by the zone processing logic 112 (FIG. 1). Thus the dominant zone 302 comprises of only one word "Colorado". The phrases and their equivalent words may be stored in the storage unit 140 (FIG. 1).

In this stage, the zone processing logic 112 (FIG. 1) may further process the text in the dominant zones. The zone identification logic 112 (FIG. 1) may identify adjectives within the dominant zones using natural language processing techniques and the found adjectives may be treated as if they are part of non-dominant zone instead of the dominant zone. For example, a dominant zone comprising of text "blue bag", the word "blue" may be identified as an adjective and the word may not be considered as part of the dominant zone. Thus, the dominant zone comprises of only one word "bag".

In another preferred embodiment, the processed zones may further be tokenized to terms by the tokenization logic 113 (FIG. 1). The process of tokenization into terms may include, but not limited to, removing of stop words, less value adding words, normalization, stemming, lemmatization, and combinations thereof.

Stop words are words which are common words in a language and are of little value in helping selecting documents. Example of stop words may be, but not limited to, "a", "an", "of", "is" etc., A word is of less value because of the word itself or because of its position in the dominant zone.

Examples of words which of less value by themselves may be, but not limited to, "inc", "LLC" etc., Examples of words which are of less value because of position may be, but not limited to, "honorable" before a noun or words which occur within parentheses in the dominant zone.

In one embodiment, the less value adding words may be considered as if they are part of non-dominant zone.

For example, in processed dominant zone 302, the word "Colorado" 304 may be tokenized and normalized by the tokenization logic 113 (FIG. 1) to "colorado". In normalization, phrases or words having the same meaning i.e. words that are equivalent to each other may be stored in such a way that a search query of either of the phrases or words would pull out similar results.

The dominant zone 302 of document 301 is tokenized to only one term "colorado". The dominant zone 312 of document 311 comprises the words "University" 314, "Colorado" 315, "Colorado" 316 which are tokenized to the terms "university", "colorado", "colorado" respectively. The word "of" in the dominant zone 312 is ignored as it is a stop word. Similarly the text in the non dominant zone is tokenized by the tokenization logic 113 (FIG. 1).

FIG. 4 depicts an exemplary processing, tokenization, score assigning and score calculation 400 of the terms of document 301 and 311.

In this embodiment, the scores are assigned to the distinct terms of the dominant zones based on the total number of distinct terms in said zone. More specifically, in this embodiment, the numeric value of a term in a dominant zone scores is inversely proportional to the number of distinct terms.

For the text in the dominant zone 302 (FIG. 3), the processing, tokenization and scoring is presented in the row 410. The terms and scores for the terms in the zone 302 (FIG. 3) are presented at the intersection of row 410 and column 404. Since the zone comprises of only one distinct term "colorado", a score of 1 may be assigned to the term.

For the text in the dominant zone 312 (FIG. 3), the processing, tokenization and scoring is presented in the row 411. The terms in the zone 312 (FIG. 3) are presented at the intersection of row 411 and column 404. Since the zone comprises of only two distinct terms, "university" and "colorado", a score of 0.9 may be assigned to each term.

Hence, as the distinct terms in the dominant zone 302 (FIG. 3) is lower than the distinct terms in dominant zone 312 (FIG. 3), the scores for terms in dominant zone 302 are greater than or equal to scores for terms in dominant zone 312 (FIG. 3).

For the text in the non-dominant zone 303 (FIG. 3), the processing, tokenization and scoring is presented in the row 412. For simplicity, only one term is shown in row 412. Since the zone is a non-dominant zone, an exemplary score of 0.1 may be assigned to each distinct term in the zone that is also not present in the dominant zone.

Note that the scores of the terms in the non-dominant zones may be always lower than the scores of the terms in the dominant zone.

For the text in the non-dominant zone 313 (FIG. 3), the processing, tokenization and scoring is presented in the row 413. For simplicity, only one term is shown in row 413. Since the zone is a non-dominant zone, a score of 0.1 may be assigned to each term in the zone. Significantly, the term "colorado" 317 (FIG. 3) will be ignored and not be assigned a score as the term is duplicate of "colorado" 315 (FIG. 3) of the dominant zone.

In one embodiment, distinct terms present in the non-dominant zone, but present in the dominant zone may not be ignored.

Note that the data in terms (score) column 404 along with an identifier to the document may be stored as index in the storage unit 140 (FIG. 1). The index may be pre-sorted by the terms.

The non-dominant zone term scores are uniform across the documents and are always lower than the dominant zone term scores. For example, in one embodiment, if there is only one term in the processed dominant zone, a score of 1 may be assigned to that term. If there are two distinct terms in the processed dominant zone, then each distinct term may be assigned a score of 0.9. If there are three terms in a processed dominant zone, each distinct term may be assigned a score of 0.8 and so on. If there are eight or more distinct terms in the dominant zone each distinct term may be assigned a score of 0.3. The terms in the non-dominant zone have a score less than 0.1.

A more generalized exemplary method of scoring terms is illustrated below. Let the score assigned to a single distinct term when there is only one distinct term in the dominant zone be "x1". The score assigned to each distinct term when there are two distinct terms in the dominant zone be "x2". The score assigned to each distinct term when there are three distinct terms in the dominant zone be "x3" and so on. Let the score for each distinct term in the non dominant zone be "n". The conditions that have to be satisfied are 1) x1>=x2, x2>=x3 and so on.
2) x1+n<2x2
   2x2+n<3x3
   . . .
   . . . so on Numbers satisfying the above criterion may be used as scores.

A user search query comprising of keyword(s) is first tokenized to terms by tokenization logic 113 (FIG. 1). The search engine logic 115 (FIG. 1) assigns a score to each document based on the summation of each search query term score in the document. A document with a higher score may be ranked higher for the query.

FIG. 5 depicts an exemplary search results page for the search query "Colorado" 501 comprising search results 502, 503, 504 and 505 for the query 501. The score calculation is done based on the exemplary score calculation as explained under FIG. 4. Search result 502 comprises of document 301 (FIG. 3). The query term "colorado" has a score of 1 in the document 301 (FIG. 3). Hence, the document score is 1 (summation of all query terms scores in the document), which is the highest for any document and it may be ranked first.

Search result 503 comprises of document 311 (FIG. 3). Similar to document 301 score calculation above, the score for the document 311 for the search query "colorado" is 0.9. The score for the search result 504 document is also 0.9. In case of a tie in document scores, the popularity of non-query terms in the dominant zone may be used to break the tie. Popularity of a term may be calculated based on the number of term a particular term appears in all the documents. In another embodiment, the popularity of terms may be calculated on the number of times a term appears in user queries. Assume that the popularity of the term "university" is higher than "history", search result 503 is ranked higher than the search result 504. The score for the search result 505 document is 0.1 and is ranked lower than all other search results.

In another embodiment, the lower the popularity of non-query terms the higher the rank of the document.

Figure 6A:
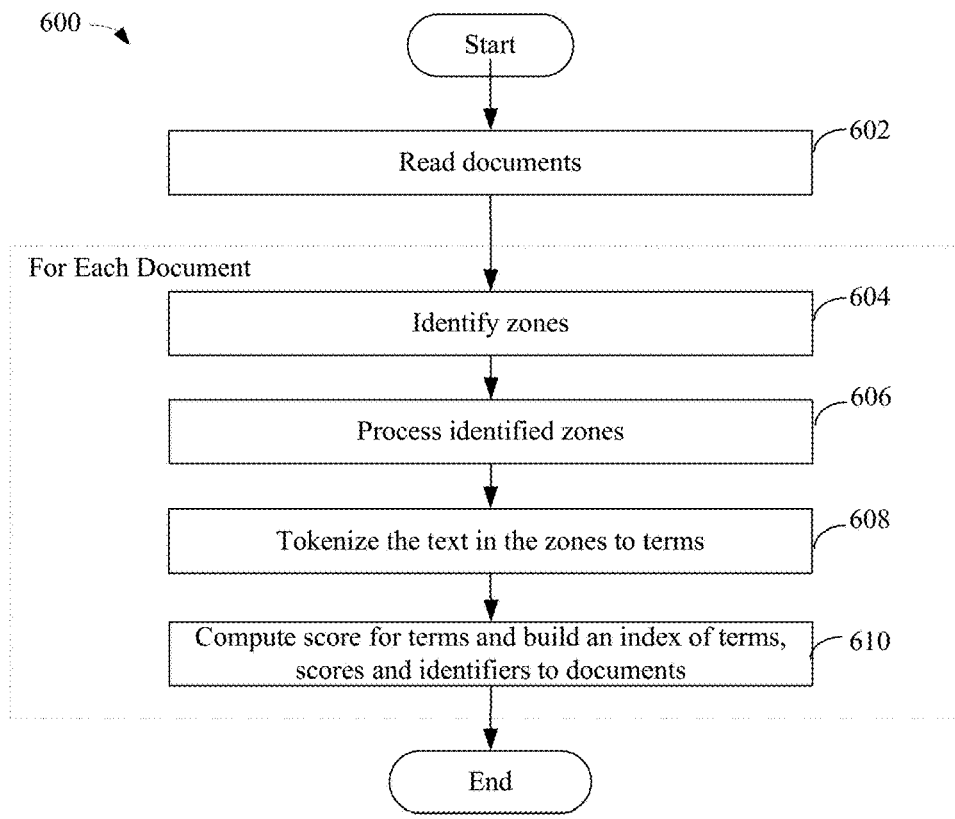
FIG. 6A and FIG. 6B are flow diagrams of a method of ranking documents in accordance with one or more embodiments.

FIG. 6A is a flowchart illustrating one method in accordance with the present disclosure. In step 602, the search engine unit 110 (FIG. 1) may read the documents. For each document step 604-610 may be performed by the search engine unit 110 (FIG. 1). In step 604, the zone identification logic 111 (FIG. 1) may identify the different zones in the document. In step 606, the zone processing logic 112 (FIG. 1) may process the zones. In step 608, the tokenization logic 113 (FIG. 1) may tokenize the content in the zones to terms. In step 610, the score calculation logic 114 (FIG. 1) may compute scores for the each distinct term and store the document, term and score information into an index.

Figure 6B:
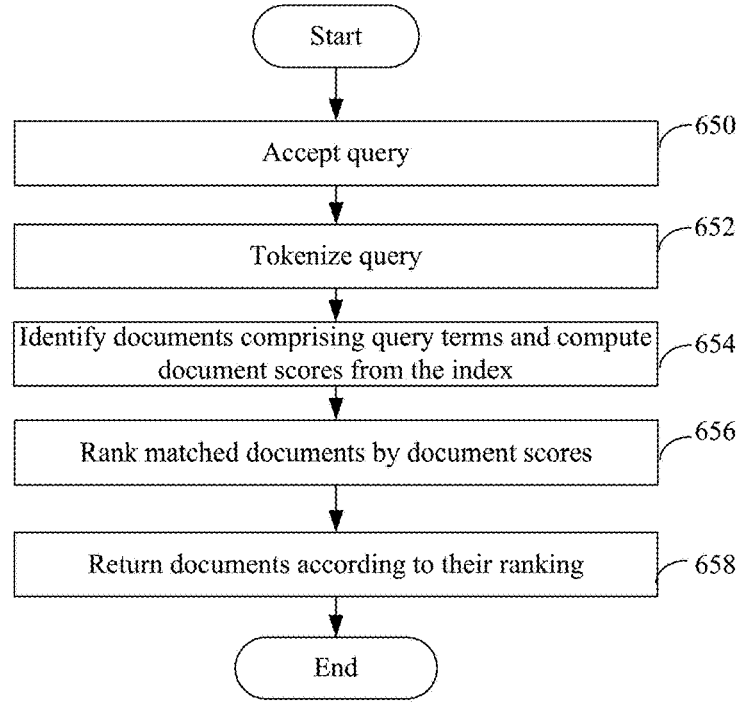

FIG. 6B is a flowchart illustrating one method in accordance with the present disclosure. In step 650, the search engine logic 115 (FIG. 1) accepts user query. In step 652, the tokenization logic 113 (FIG. 1) may tokenize the search query keyword(s) to terms. In step 654, scores may be calculated for each document from the summation of all query terms scores in the document. In step 656, the documents are ranked according to the document scores. In step 658, the documents are returned to the user according to the document ranks.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

The invention claimed is:

1. A computer implemented method of ranking results of a search operation comprising:
   (a) accepting a search query comprising search query terms;
   (b) identifying documents comprising the search query terms;
   (c) for each document, computing a search query term score for each search query term, wherein the search query term score is a dominant zone score or a non-dominant zone score for a matching term in the document calculated by; (c1) dividing said document into dominant and non-dominant zones; (c2) calculating number of distinct terms in the dominant zone and assigning a dominant zone score to the distinct terms, such that the dominant zone term score is inversely proportional to the number of distinct terms in said zone; (c3) assigning a non-dominant zone score for distinct terms in the non-dominant zones that are not present in the dominant zones; and (c4) computing a search query term score for each search query term, wherein the search query term score is a dominant zone score or a non-dominant score for a matching term in document;
   (d) computing a document score for each document wherein the document score is a sum total of the matched search query term scores; and
   (e) ranking the documents based on the computed document score for each document.

2. The method as in claim 1, wherein the dominant zone term scores and the non-dominant zone term scores are pre-computed and stored in an index.

3. The method as in claim 1, wherein the zones are tokenized to terms prior to assigning a dominant zone score or a non-dominant zone score to each term.

4. The method as in claim 3, wherein the tokenization comprises removing less value adding words.

5. The method as in claim 1, wherein the dominant zone is processed said method comprising identifying adjectives in the dominant zone and treating the adjectives as if the adjectives are part of non-dominant zone.

6. The method as in claim 1, wherein the documents with a higher document score are ranked higher.

7. The method as in claim 1, where in the documents with the same document score may be further ranked based on frequency and/or popularity of non-query terms in the dominant zone.

8. The method as in claim 1, wherein the dominant zone is a title.

9. The method as in claim 1, wherein the search query is tokenized into terms.

10. The method as in claim 1, wherein the dominant zones of said document are combined into one dominant zone.

11. The method as in claim 1, wherein the non-dominant zone of said document are combined into one non-dominant zone.

* * * * *